US005699065A

United States Patent [19]

Murray

[11] Patent Number: 5,699,065

[45] Date of Patent: Dec. 16, 1997

[54] REMOTE CONTROL TRANSMITTER AND METHOD OF OPERATION

[75] Inventor: James S. Murray, Redford, Mich.

[73] Assignee: Stanley Home Automation, Novi, Mich.

[21] Appl. No.: 585,513

[22] Filed: Jan. 16, 1996

[51] Int. Cl.[6] ............................ G08C 19/12; H04L 17/02

[52] U.S. Cl. ........................ 341/176; 341/23; 340/825.31; 340/825.54; 380/23; 380/43

[58] Field of Search ........................ 341/23, 176; 380/23, 380/43; 340/825.31, 825.54

[56] References Cited

U.S. PATENT DOCUMENTS

| | | | |
|---|---|---|---|
| Re. 29,525 | 1/1978 | Willmott | 325/37 |
| 3,582,783 | 6/1971 | Hendrickson | 325/37 |
| 3,609,390 | 9/1971 | Feldman | 307/134 |
| 3,716,865 | 2/1973 | Willmott | 343/225 |
| 4,037,201 | 7/1977 | Willmott | 340/167 R |
| 4,178,549 | 12/1979 | Ledenbach et al. | 325/38 R |
| 4,385,296 | 5/1983 | Tsubaki et al. | 340/825.72 |
| 4,482,947 | 11/1984 | Zato et al. | 364/138 |
| 4,538,661 | 9/1985 | Henry et al. | 160/35 |
| 4,596,985 | 6/1986 | Bongard et al. | 340/825.69 |
| 4,653,565 | 3/1987 | Iha et al. | 160/193 |
| 4,774,511 | 9/1988 | Rumbolt et al. | 340/825.69 |
| 4,806,930 | 2/1989 | Wojciak, Jr. | 340/825.69 |
| 4,855,746 | 8/1989 | Stacy | 341/176 |
| 4,866,434 | 9/1989 | Keenan | 340/825.72 |
| 4,912,463 | 3/1990 | Li | 340/825.69 |
| 5,252,960 | 10/1993 | Duhame | 341/176 |
| 5,331,325 | 7/1994 | Miller | 341/176 |
| 5,442,340 | 8/1995 | Dykema | 341/176 |
| 5,451,953 | 9/1995 | Duffield | 341/176 |
| 5,471,668 | 11/1995 | Soenen et al. | 341/176 |
| 5,473,318 | 12/1995 | Martel | 340/825.31 |
| 5,479,155 | 12/1995 | Zeinstra et al. | 340/825.22 |
| 5,528,230 | 6/1996 | Kim | 341/176 |

*Primary Examiner*—Jeffery Hofsass
*Assistant Examiner*—Timothy Edwards, Jr.
*Attorney, Agent, or Firm*—Young & Basile, P.C.

[57] ABSTRACT

A remote control transmitter capable of transmitting a coded signal for actuating a device connected to a remote receiver. The remote control transmitter includes an electronic control device which controls the operation of the transmitter. A transmitter activation switch is connected to the electronic control device and acts to energize the transmitter. A first code generating device is capable of creating a first code and a second code generating device is capable of creating a second code. The two code generating devices are connected to the electronic control device. The electronic control device contains means for automatically selecting between the first and second codes for transmitting within the coded signal. A transmitting device is connected to the electronic control device for transmitting the coded signal to the remote receiver.

10 Claims, 6 Drawing Sheets

REMOTE CONTROL TRANSMITTER AND METHOD OF OPERATION

FIELD OF THE INVENTION

The present invention relates to a wireless remote control transmitter capable of automatically transmitting one of two different encoded signals, for activating a remote receiver.

BACKGROUND OF THE INVENTION

Various types of remote control systems are available for use with garage door openers, home automation systems, vehicle locking systems, and the like. A common element found in many remote control systems is the use of an encoded signal transmitted from a transmitter to a remote receiver. The receiver receives the encoded signal, compares the code contained within the signal with a predetermined valid code or codes, and activates the remotely controlled device if the code is valid. If an invalid code is received by the receiver, the remotely controlled device is not activated.

Various systems have been developed to ensure that the encoded signal transmitted by the transmitter is accepted by the receiver. Early systems used a series of switches contained in both the receiver and the transmitter which could be set to any pattern desired by the user. Typically, a series of two-position or three-position slide switches or rocker switches are contained in both the transmitter and the receiver. The user of the remote control system sets the pattern of the switches in both the transmitter and the receiver to be identical. If multiple transmitters are used with a single receiver, the switches in each transmitter are set to the same pattern; i.e., the pattern set in the receiver.

Remote control systems which require the setting of various switches are somewhat tedious, especially for a user who is not mechanically inclined. If the transmitter and receiver are purchased as a single unit, the switches in both devices may be set to match one another at the factory. However, if the units are purchased separately, or if an additional or replacement transmitter is purchased at a later date, the user must set the switches before the system can be used. This requires first determining the switch settings in the existing receiver. Next, the new or replacement transmitter is partially disassembled to access the switches contained within the transmitter. The switches in the transmitter are then set to match those of the receiver, and the transmitter is reassembled.

Another type of remote control system uses a "smart" receiver design which is capable of learning a code contained in a transmitter. Typically, these smart receivers include a memory device capable of storing several different valid codes, thereby allowing use of several different transmitters, each having a different code. Transmitters used with smart systems do not use switches to set the transmitted code, but instead use a permanent electronic serial number. This electronic serial number is unique to each transmitter and cannot be changed by the user.

Smart systems operate by first placing the receiver in a "learn" mode wherein it stores any encoded signal received from a transmitter. Once the receiver is switched to the learn mode, activating a transmitter to be used with the receiver stores that transmitter's code in the receiver's memory. The transmitter is activated in the usual manner, such as by pressing the activation switch. Since the transmitter does not use switches to generate the code, a minimal amount of user interaction is required. User interaction is usually limited to the movement of a single switch on the receiver between a "learn" position and an "operate" position, and activation of the transmitter.

Remote control systems for operating a garage door typically consist of a receiver unit permanently mounted in the garage, adjacent the motor-driven garage door opener. One or more remote transmitters are located in the vehicles which will require access to the particular garage door. Since the transmitter units are small portable devices located within the car, they are susceptible to damage, theft, or misplacement. Therefore, it is common for the receiver to outlive or outlast the portable transmitter. When a portable transmitter is replaced, the user must know which type of receiver unit is located in the garage, and purchase the appropriate transmitter for that receiver system. Furthermore, the merchant who sells remote control systems must maintain a stock of transmitters capable of operating the older, switch-controlled coding systems as well as a stock of newer, smart transmitter devices. Therefore, the merchant must either maintain a supply of two different portable transmitters or neglect customers who own older systems, and carry only the newer smart transmitters.

SUMMARY OF THE INVENTION

The present invention provides a remote control transmitter which is capable of automatically selecting between two different code generating sources within the transmitter. The first code generating source is used to operate older, switch-controlled remote control systems. The second code generating source is used with newer, "smart" remote control systems. According to the present invention, a single transmitter is capable of performing the functions of both the earlier remote control systems as well as the newer systems, thereby eliminating the need to provide two separate types of transmitters. The selection of the proper code generating source is transparent to the user due to automatic code selection by the transmitter.

According to the present invention, the remote control transmitter is capable of transmitting an encoded signal for actuating a device connected to a remote receiver. The remote control transmitter includes an electronic control device for controlling the operation of the transmitter. An activation switch is connected to the electronic control device and is capable of energizing the transmitter. A first code generating device is capable of creating a first code and a second code generating device is capable of creating a second code. The electronic control device contains a system for automatically selecting between the first code and the second code. The selected code will be included within the encoded signal. A transmitting device is connected to the electronic control device and transmits the encoded signal to the remote receiver.

According to another aspect of the present invention, the first code generating device is a plurality of multiple-position switches connected to the electronic control device. The second code generating device is a silicon serial identification device capable of generating a serial stream of data and connected to the electronic control device.

Another feature of the present invention provides that the electronic control device is a microcontroller having a plurality of input connections. A single microcontroller input connection is connected to both the first code generating device and the second code generating device. A plurality of the microcontroller input connections are connected to the first code generating device alone.

According to a further aspect of the inventive transmitter, the means for automatically selecting between the first and second codes is an algorithm contained in the electronic control device. The algorithm is capable of determining the position of the plurality of multiple-position switches contained in the first code generating device. The code selected is based on the position of the multiple-position switches.

When selecting the proper code to be included within the encoded signal, the multiple-position switches are compared to a predetermined pattern. If the switches match the predetermined pattern, then the second code is included in the encoded signal. If the switches do not match the predetermined pattern, then the first code is included in the encoded signal.

DETAILED DESCRIPTION OF THE PREFERRED EMBODIMENT

Figure 1:
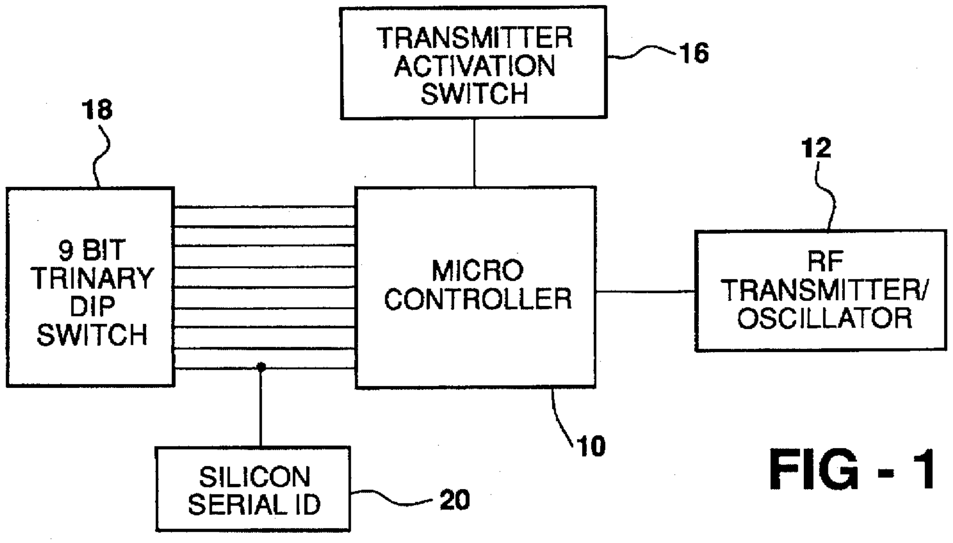
FIG. 1 illustrates a block diagram of a wireless remote control transmitter according to the present invention.

Referring to FIG. 1, a block diagram of the remote control transmitter as used in the present invention is illustrated. The remote control transmitter illustrated in FIG. 1 may be a portable unit located in a vehicle or an underhood unit permanently installed in a vehicle. This type of underhood installation is further described in U.S. Pat. No. 5,140,171, which is incorporated herein by reference. A microcontroller 10 controls the overall operation of the transmitter. Microcontroller 10 (shown schematically in FIG. 4) includes a series of input pins and output pins. An output pin of microcontroller 10 is connected to a radio frequency transmitter/oscillator 12 which transmits an encoded signal to a remote receiver (not shown). The transmitter/oscillator 12 is shown in schematic detail in FIG. 4.

A transmitter activation switch 16 is electrically connected to an input pin of microcontroller 10. When the invention is embodied in a portable transmitter, transmitter switch 16 is a momentary push-button switch providing momentary activation when pressed. When the invention is permanently installed in a vehicle, transmitter switch 16 is incorporated into the vehicle headlight system such that switch 16 shares a function with the high beam control switch, as described in U.S. Pat. No. 5,140,171.

Figure 2:
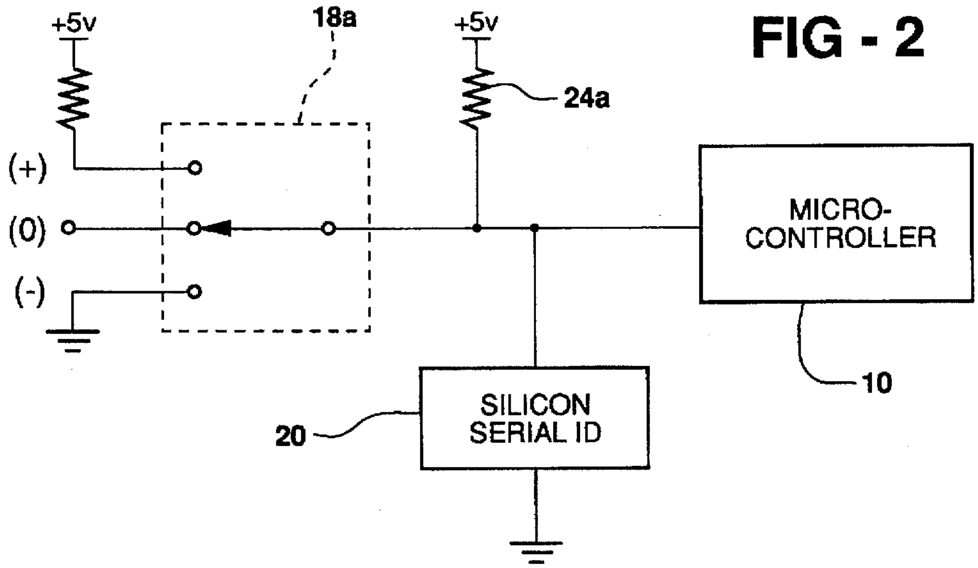
FIG. 2 is a partial block diagram of the remote control transmitter of FIG. 1 illustrating the code generating sources and a representative switch.

A 9-bit trinary DIP switch 18 is connected to nine input pins of microcontroller 10. As shown in FIG. 2, trinary DIP switch 18 contains separate switches 18*a* arranged linearly in a single package. Each of the individual switches 18*a* has three different possible positions: a (+) position, a (−) position, and an open position. A silicon serial ID 20 is connected to a single input pin of microcontroller 10. As shown in FIGS. 1 and 2, serial ID 20 shares an input pin of microcontroller 10 with a single switch 18*a*.

Figure 4:
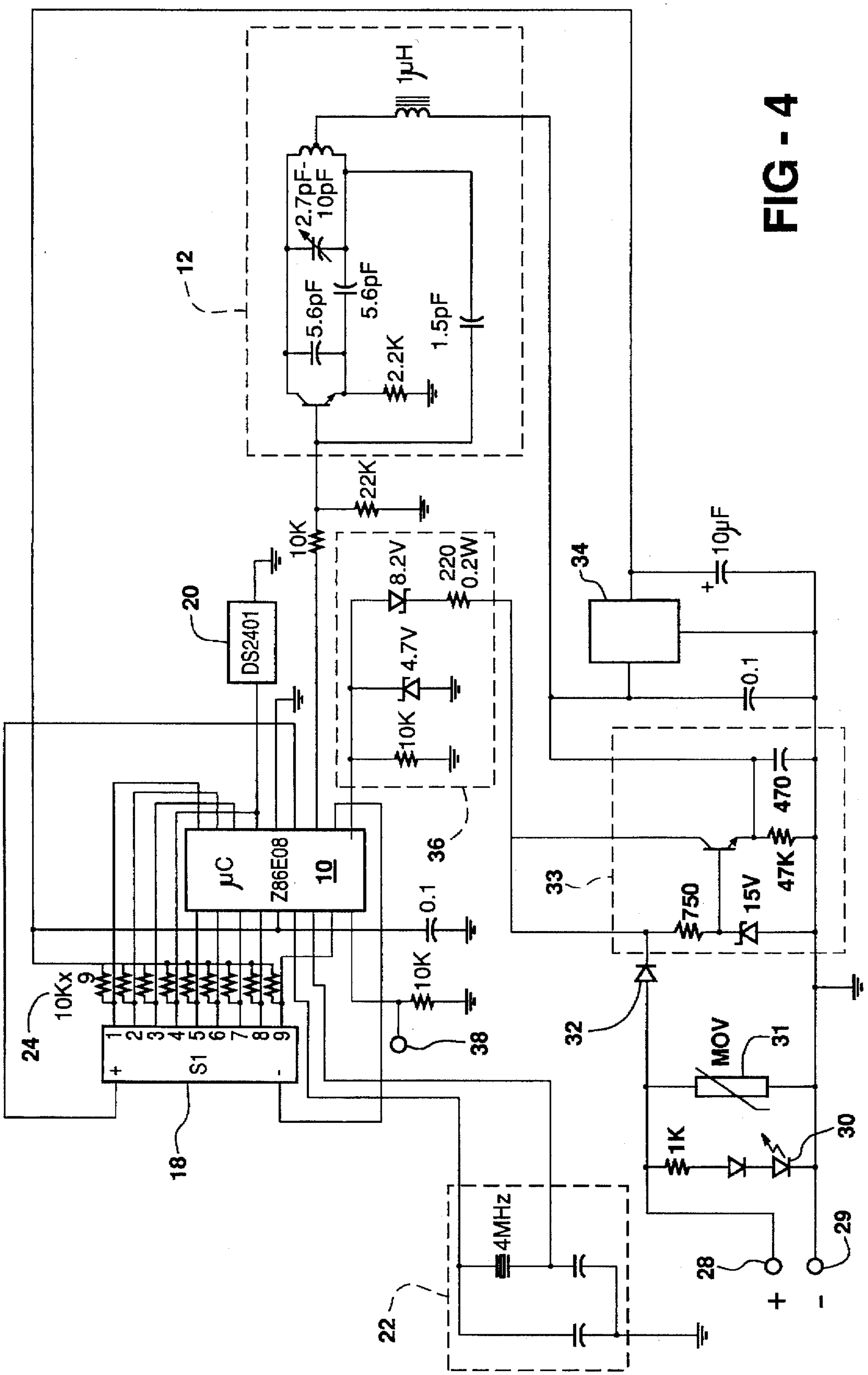
FIG. 4 is a schematic drawing showing the components of the remote control transmitter and their electrical interconnection as used in a permanent vehicle installation.

Referring to FIG. 4, an output side of switch 18 is connected to both the input pins of microcontroller 10 and a resistor network 24. Resistor network 24 is connected to +5 volts and acts as a pull-up resistor for each input pin. An input side of switch 18 has two connection pins labeled (+) and (−), both of which are connected to a pin of microcontroller 10. Each switch 18*a* may be set to one of three different positions ((+), (−), or open). In the (+) position, the switch connects +5 volts to the switch output, and therefore generates a +5 volt signal at the input pin of microcontroller 10. In the open position, the switch is not connected to any other circuit, but remains open. In the (−) position, the switch connects signal ground to the switch output, thereby generating a ground signal at the input pin of microcontroller 10.

As illustrated in FIG. 2, silicon serial ID 20 is electrically connected between one of the trinary DIP switches 18*a* and an input pin of microcontroller 10. Serial ID 20 is preferably a Dallas Semiconductor Model 2401 which produces a serial stream of binary data. Each serial ID 20 contains a unique 48 bit electronic serial number permanently stored in the device. When activated, serial ID 20 generates this unique serial number by providing a serial stream of data to microcontroller 10 through the input pin. The silicon serial ID is only used when switch 18*a* is in the open position; i.e., not connected to either +5 volts or ground. Therefore, the output of serial ID 20 is not in contention with either the (+)5 volt connection or the ground connection.

Figure 3:
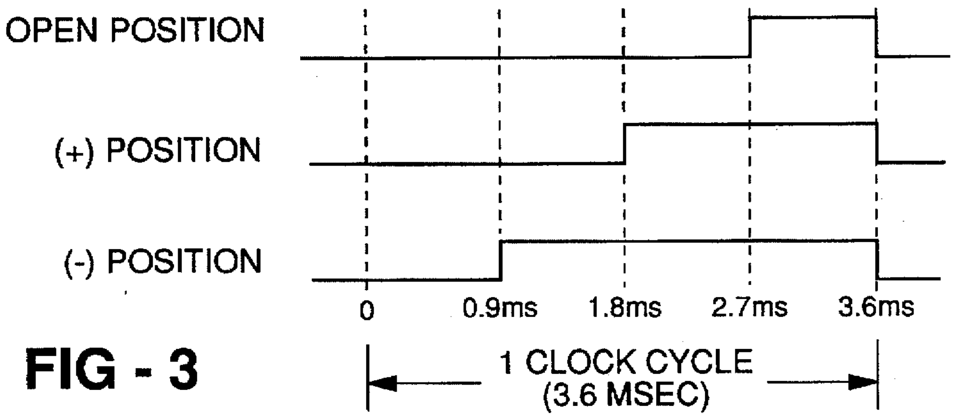
FIG. 3 illustrates the transmission characteristics of the remote control transmitter signal.

FIG. 3 illustrates the transmission format used by the remote control transmitter according to this invention. RF transmitter 12 transmits radio frequency signals using a trinary protocol. Each cycle of the transmission is 3.6 milliseconds in length, as shown in FIG. 3. During the first 0.9 milliseconds of each cycle, the transmission signal is always LO. To transmit a character representing the negative switch position, a signal is transmitted during the remainder of the cycle (0.9 milliseconds(−)3.6 milliseconds). If a positive switch setting is to be transmitted, a LO signal is transmitted during the first 1.8 milliseconds, and a HI signal is transmitted during the remaining 1.8 milliseconds. Finally, if the open switch position is selected, the first 2.7 milliseconds are transmitted as a LO signal and the remaining 0.9 milliseconds as a signal. A sequence of pulses of the form shown constitutes a pulse train which is impressed upon the RF signal to carry the coded data stored in 9-bit trinary DIP switches 18 or silicon serial ID 20.

The three different signal types illustrated in FIG. 3 correspond with the three different switch positions available for switch 18*a*. Similarly, although serial ID 20 creates a binary data stream, its serial number is converted to base 3 and transmitted as a trinary data stream, using the format illustrated in FIG. 3.

Referring to FIG. 4, a schematic diagram of the remote control transmitter is shown as used in a permanent vehicle installation. Microcontroller 10 shown in FIG. 4 is manufactured by Zilog as part number Z86E08 (one-time programmable version) or Z86C08 (masked version). The masked version contains a custom program for use with a specific application.

Terminals 28 and 29 are connected to the vehicle's high beam circuitry, as described in U.S. Pat. No. 5,140,171. Terminals 28 and 29 provide power to the transmitter as well as an activation signal produced by the high beam switch. A light emitting diode 30 indicates whether power is being supplied to the transmitter circuit.

A Metal Oxide Varistor 31 is connected across terminals 28 and 29 to dissipate voltage surges and spikes, thereby protecting the remaining circuitry from damage. A diode 32 also protects the circuit from damage by preventing reverse currents which may occur when jump-starting the vehicle.

The circuit identified by block 33 provides power to RF transmitter/oscillator circuit 12. A voltage regulator 34 produces a +5 volt power supply for the digital components requiring such a supply voltage. The circuit identified by block 36 functions to create a trigger signal for microcontroller 10 and clamps the voltage at 4.7 volts. A test point 38 provides an alternate trigger point for activating microcontroller 10 during assembly or diagnostic testing.

RF transmitter/oscillator circuit 12 is connected to an output pin of microcontroller 10 and generates a radio frequency signal transmitted to the remote receiver. An oscillator circuit 22 supplies a necessary clock signal to microcontroller 10.

The (+) and (−) pins of switch 18 are connected to microcontroller 10, thus permitting the microcontroller to control the voltage level applied to the pins of the switch. This control is necessary to determine the position of each individual switch 18*a*, as described below.

Figure 5:
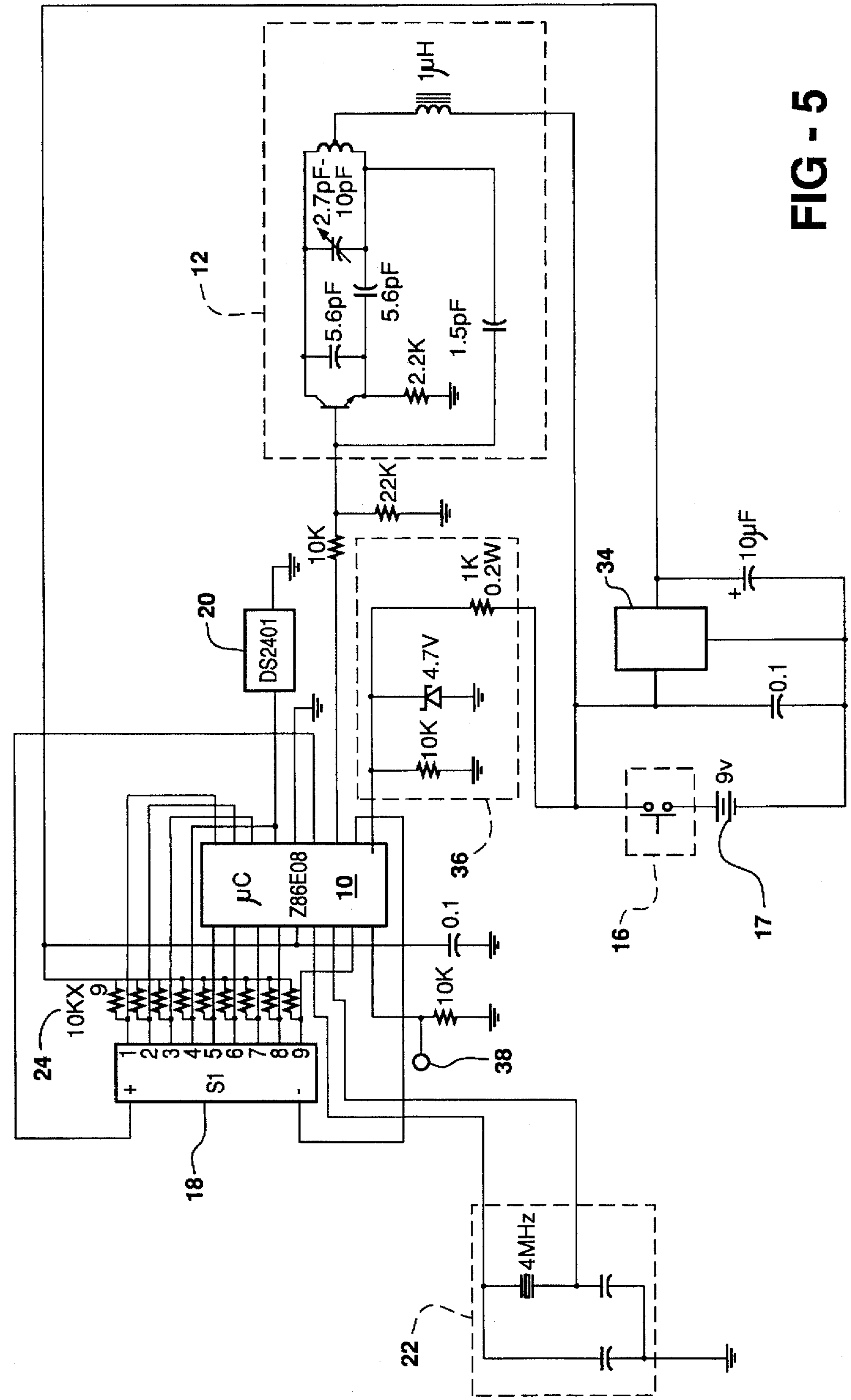
FIG. 5 is a schematic drawing showing the electrical interconnection of the remote control transmitter components as used in a portable transmitter.

FIG. 5 illustrates a schematic drawing for the circuit as used in a portable transmitter. The schematic in FIG. 5 is similar to FIG. 4, with common components being referenced with common reference numerals. Switch 16 is a momentary push button switch which activates the transmitter circuit when actuated.

A 9 volt battery 17 is connected in series with switch 16 to provide power to the transmitter circuit when the switch is actuated. The remaining components shown in FIG. 5 are connected as described with reference to FIG. 4, and function in the same manner.

In operation, the transmitter is activated when the transmitter switch is actuated. The transmitter switch may be a push button switch as used with the portable transmitter or a high beam switch as used in a permanent vehicle installation. Regardless of the transmitter switch used, once the transmitter is activated, it operates in a single manner.

Figure 6:
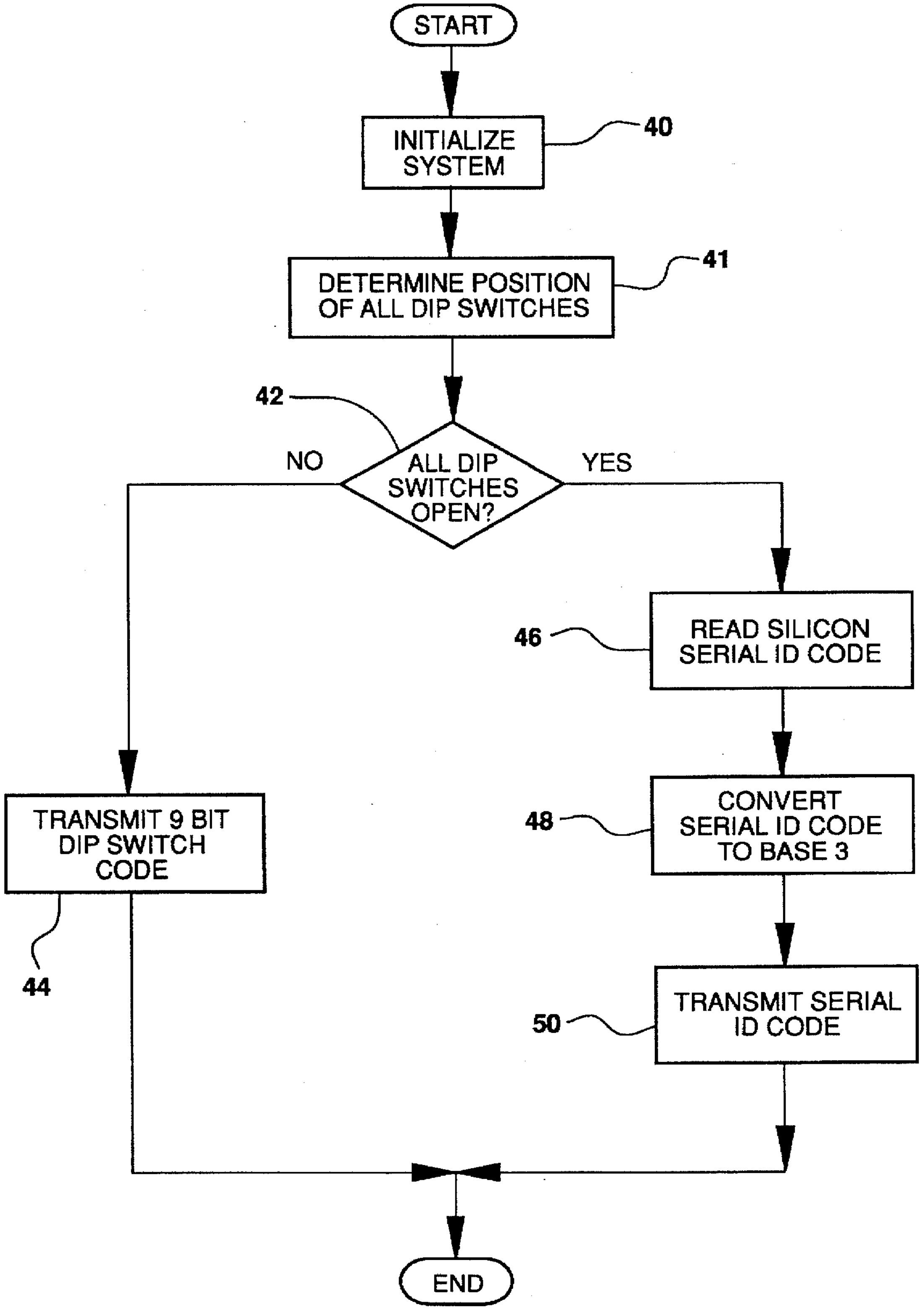
FIG. 6 is a flow chart illustrating the procedure for automatically selecting the code generating source.

As illustrated in FIG. 6, the microcontroller is initialized at step 40 as a first step in transmitting the proper encoded signal. After initialization, the transmitter checks the position of all nine trinary switches 18 at step 41. At step 42, the microcontroller specifically checks each switch 18*a* to determine whether the switch is in the open position. Additional details regarding step 42 are described later with reference to FIG. 7.

If microcontroller 10 determines that at least one of the nine trinary switches 18 is not in the open position, then the program routine branches to step 44 where the microcontroller uses the 9-bit code generated by trinary switch 18 to create the pulse train carried by the transmitted RF signal. Thus, when any one or more trinary switches 18 is in the positive or negative position, the 9-bit trinary switch code is used to generate the encoded signal.

If microcontroller 10 determines that all nine of the trinary switches 18*a* are in the open position, then serial ID 20 will be used to generate the encoded signal. In this case, the routine branches to step 46 where microcontroller 10 reads the code contained in serial ID 20. Next, at step 48, the serial number read from serial ID 20 is converted from a binary sequence to a base 3 sequence. Finally, in step 50, the encoded signal containing the serial ID code, as converted to base 3, is transmitted.

Figure 7:
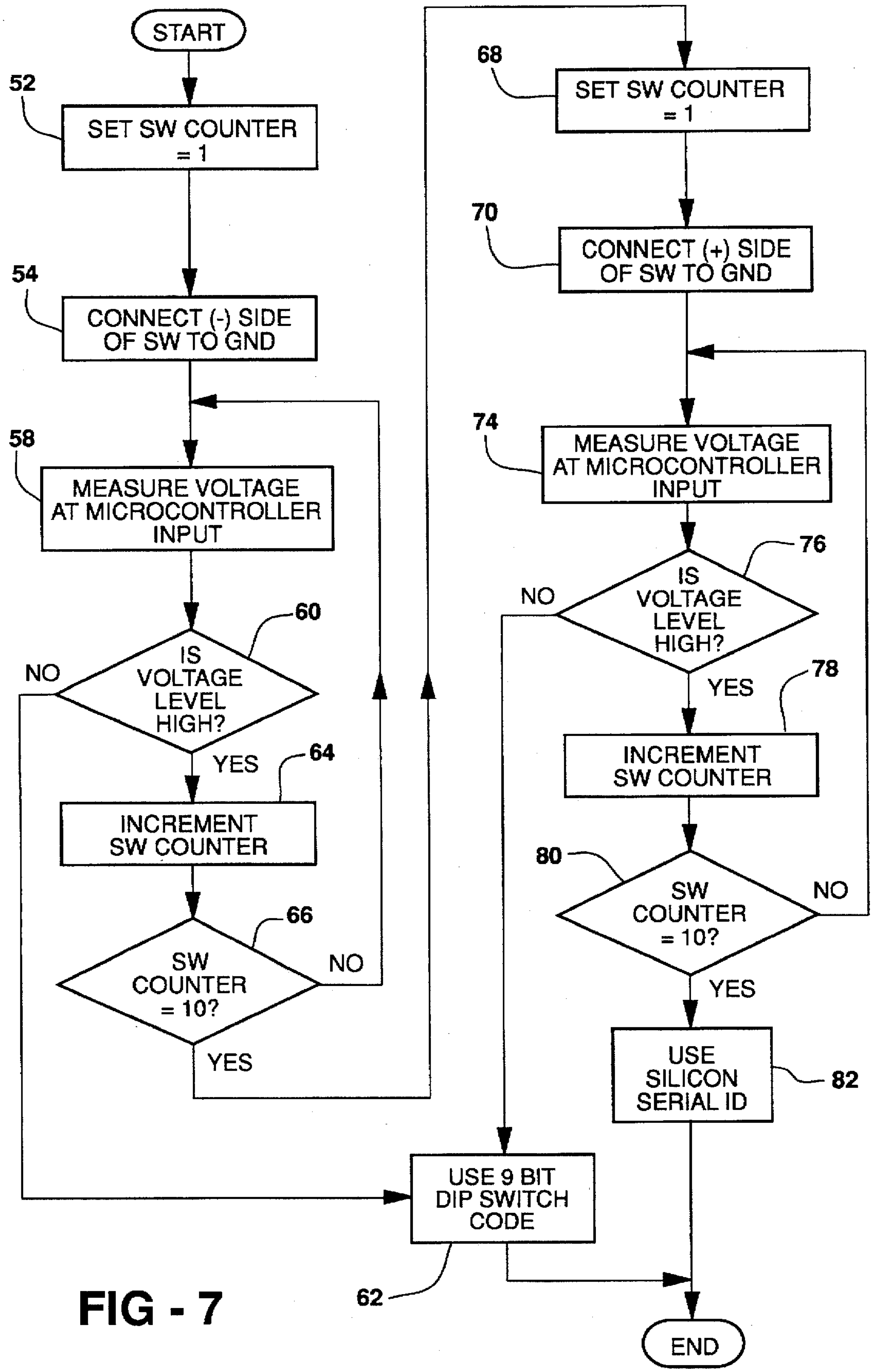
FIG. 7 is a flow chart detailing the method used to determine which code sources is selected.

FIG. 7 illustrates a flow chart describing the method used by microcontroller 10 to determine whether all trinary switches 18 are in the open position. At step 52, a switch counter is set to 1; the switch counter represents the number of the switch currently being analyzed. In step 54, the negative side of switch 18 currently being analyzed is connected to ground. At step 58, microcontroller 10 measures the input voltage at the microcontroller.

At step 60, if the voltage level measured is not high, this indicates that the switch being analyzed is connected to ground, as the only path to dissipate the current. Therefore, the switch is not set to the open position, and the 9-bit trinary code is selected at step 62. If the voltage level measured at step 60 is high, then the switch must be in the open position.

At step 64, the switch counter is incremented, and at step 66 the switch counter is tested for a value of 10. If the switch counter does not equal 10, then all of the switches have not yet been tested, and the routine branches to step 58 and repeats step 60. If any voltage level is not high at step 60, the microcontroller selects the 9-bit DIP switch code.

In step 66, if switch counter equals 10, then the program continues to step 68 where the switch counter is reset to 1 and then to step 70 where the positive side of the trinary switch being analyzed is connected to ground. At step 74 microcontroller 10 measures the voltage at its input. At step 76, microcontroller 10 determines whether the measured voltage is high. If the measured voltage is low, this indicates that the switch position is in the + position rather than in the open position and the routine branches to step 62, where the 9-bit trinary code is selected for the encoded signal.

If the voltage level measured at step 74 is high, then the switch counter is incremented at step 78, and tested for a value of 10 at step 80. If the switch counter does not equal 10, then the routine branches back to step 74 and repeats step 76. At step 80, if switch counter equals 10, then all nine switches have been determined to be in the open position. In this case, step 82 is executed, and the electronic serial number contained in silicon serial ID 20 is selected for the encoded signal.

As illustrated in FIG. 7, microcontroller 10 determines whether each of the nine trinary switches 18 are in the open position by process of elimination. First, each switch is tested to determine whether it is set in the negative position. Next, all switches are tested to determine whether they are set in the positive position. Only after determining that no switches are in the negative position and no switches are in the positive position, does the microcontroller conclude that all switches are in the open position. As stated earlier, switches 18 provide a trinary signal to the microcontroller. However, since microcontroller 10 is a binary device, the trinary code produced by switch 18 must be converted to a binary code for processing by the microcontroller. Since serial ID 20 provides a binary data stream to microcontroller 10, no conversion is necessary to process the binary data stream.

Figure 8:
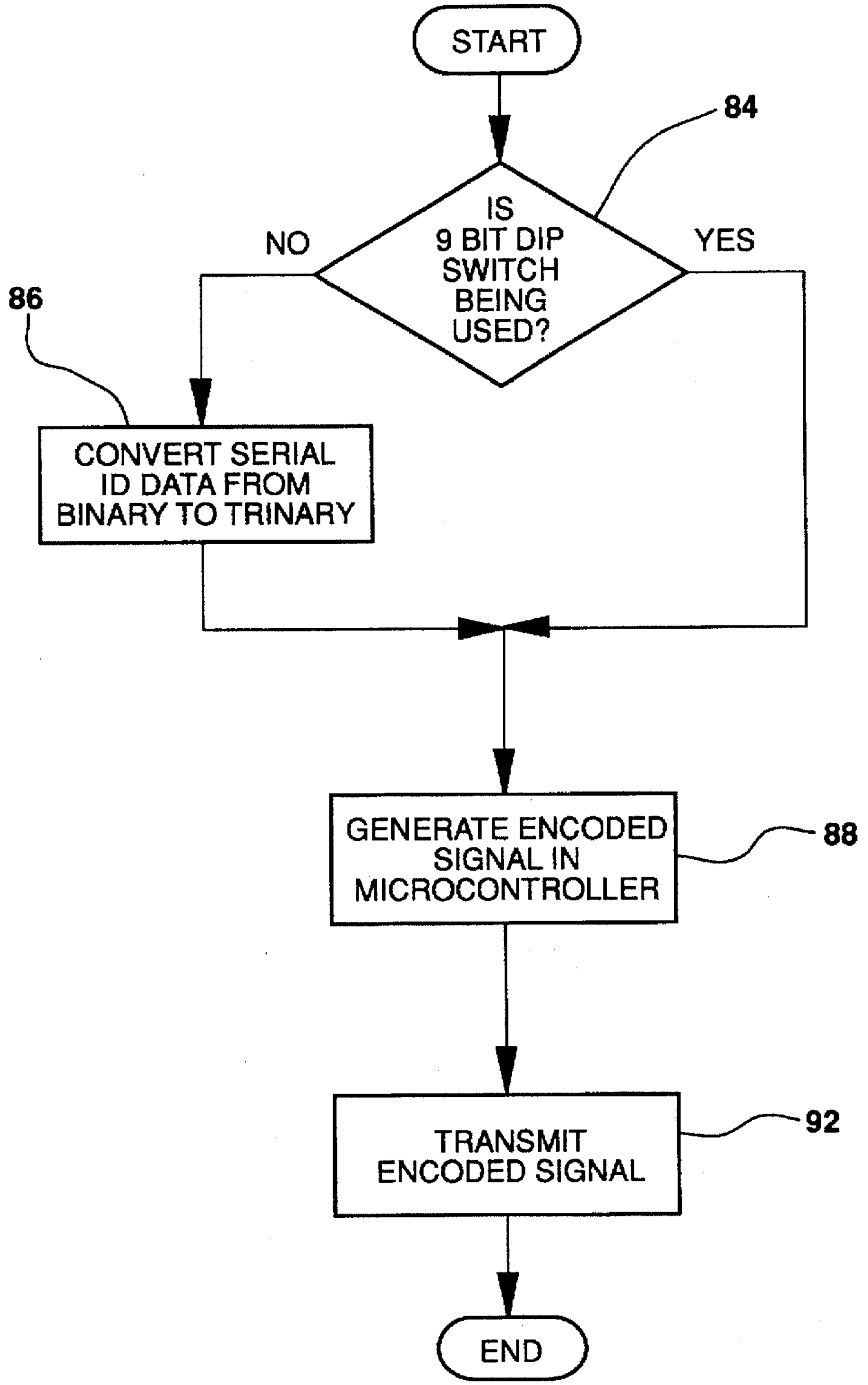
FIG. 8 is a flow chart showing the method used to generate the transmitted signal.

Referring to FIG. 8, a flow chart illustrates the procedure followed by microcontroller 10 when receiving the coded information, and converting it, as necessary. In step 84, the microcontroller 10 determines whether or not the 9-bit trinary code provided by switch 18 is the code selected to be used by the transmitter (this determination is made at step 62 in FIG. 7). If the 9-bit trinary data is to be used, the routine branches to 88. If the 9-bit trinary data is not used; i.e., the silicon serial number is used, then the routine branches to step 86 and converts the binary serial ID to a trinary valve, then to 88 and generates the data stream to be transmitted by the RF transmitter which will include the selected code. The data stream generated by the microcontroller includes all necessary start bits and stop bits occurring before and after the coded data, respectively.

Finally, at step 92, microcontroller 10 transmits the trinary data stream using RF transmitter 12. The actual wave form patterns to be transmitted are illustrated in FIG. 3, and discussed above.

The above operations are performed each time transmitter switch 16 is activated. Therefore, microcontroller 10 verifies the position of switch 18 upon each activation. If the user of the transmitter has changed any of the switch settings, microcontroller 10 will respond accordingly upon the next activation of switch 16. Thus, the user need not indicate to the remote control transmitter that any changes have taken place; any changes are identified automatically during the next activation cycle.

Although the operation of the remote control transmitter has been described with respect to a portable transmitter, it will be understood that the same methods and procedures may be used to operate the remote control transmitter if incorporated into the vehicle's high beam switch or otherwise permanently mounted to the vehicle.

Furthermore, the present invention has been described with respect to a remote control transmitter used with a garage door operating system. However, the inventive transmitter is equally applicable to any situation where two or more code generation systems are required, and automatic selection between the systems is desired.

Although a particular microcontroller has been shown and described, it will be understood that other microcontrollers may be used to practice the present invention. Other silicon serial IDs may also be used.

The present invention may also utilize other transmission formats such as infrared, audio, etc.

I claim:

1. A remote control transmitter capable of transmitting a coded signal comprising a coded pulse train impressed upon a carrier signal for actuating a device connected to a remote receiver, said transmitter comprising:

an electronic control device for controlling the operation of said transmitter;

a transmitter activation switch electrically coupled to said electronic control device for energizing said transmitter;

a first code generating device electrically coupled to said electronic control device for creating a first code usable in the production of said coded pulse train;

a second code generating device electrically coupled to said electronic control device for creating a second code usable in the production of said coded pulse train;

means for comparing said first code to a predetermined pattern and determining whether said first code matches said predetermined pattern, automatically selecting between said first and second codes based on the results of said comparison, producing said coded pulse train from the selected code and impressing said coded pulse train upon said carrier signal to produce said coded signal, said means contained within said electronic control device; and a transmitting device electrically coupled to said electronic control device for transmitting said coded signal to said remote receiver.

2. The remote control transmitter of claim 1 wherein said second code generating device is a silicon serial identification device capable of generating a serial stream of data and electrically coupled to said electronic control device.

3. The remote control transmitter of claim 1 wherein said electronic control device is a microcontroller having a plurality of input connections, a single microcontroller input connection electrically coupled to both said first code generating device and said second code generating device, and a plurality of said microcontroller input connections electrically coupled to said first code generating device.

4. A remote control transmitter capable of transmitting a coded radio frequency signal comprising a coded pulse train impressed upon a carrier signal for actuating a device connected to a remote receiver, said transmitter comprising:

a microcontroller for controlling the operation of said transmitter, said microcontroller having a plurality of input connections and at least one output connection;

a transmitter activation switch electrically coupled to said microcontroller for energizing said transmitter;

a plurality of multiple-position switches electrically coupled to said microcontroller input connections for generating a first code for use in creating said coded pulse train;

a silicon serial identification device electrically coupled to one of said microcontroller input connections and capable of generating a serial stream of data representing a second code for use in creating said coded pulse train;

means for automatically selecting between said first code and said second code depending upon the position of at least one of said multiple-position switches, producing said coded pulse train utilizing said automatically selected code and impressing said coded pulse train upon said carrier signal to create said coded radio frequency signal, said means contained within said microcontroller; and a radio frequency transmitter electrically coupled to said microcontroller output connection, said radio frequency transmitter capable of transmitting said coded radio frequency signal.

5. The remote control transmitter of claim 4 wherein said means for automatically selecting between said first and second codes is an algorithm contained in said microcontroller and capable of determining the position of said plurality of multiple-position switches contained in said first code generating device, said code to be selected based on the position of said multiple-position switches.

6. A method of automatically selecting between a first code and a second code to be used in creation of a coded pulse train transmitted in a coded carrier signal from a remote control transmitter, said coded signal capable of actuating a device connected to a remote receiver, said method comprising the steps of:

a) reading said first code provided by a first code generating device;

b) comparing said first code to a predetermined pattern and determining whether said first code matches said predetermined pattern;

c) selecting said first code to be used in creation of said coded pulse train if said code fails to match said predetermined pattern;

d) selecting said second code to be used in creation of said coded pulse train if said first code matches said predetermined pattern; and e) transmitting said coded carrier signal containing the selected code from said remote control transmitter.

7. A remote control transmitter capable of transmitting a coded signal comprising a coded pulse train impressed upon a carrier signal for actuating a device connected to a remote receiver, said transmitter comprising:

an electronic control device for controlling the operation of said transmitter;

a transmitter activation switch electrically coupled to said electronic control device for energizing said transmitter;

a first code generating device comprising a plurality of multiple position switches electrically coupled to said electronic control device for creating a first code usable in the production of said coded pulse train;

a second code generating device electrically coupled to said electronic control device for creating a second code usable in the production of said coded pulse train;

means contained within said electronic control device for automatically selecting between said first and second codes, said means comprising an algorithm capable of determining a position of at least one of said plurality of multiple-position switches and making said selection based on said position of said multiple-position switch;

means for producing said coded pulse train from the selected code and impressing said coded pulse train upon said carrier signal to produce said coded signal; and a transmitting device electrically coupled to said electronic control device for transmitting said coded signal to said remote receiver.

8. The remote control transmitter of claim 7 wherein said second code is selected for said coded signal if said plurality of multiple-position switches contained in said first code generating device match a predetermined pattern, and said first code is selected for said coded signal if said plurality of multiple-position switches fail to match said predetermined pattern.

9. The remote control transmitter of claim 7 wherein said second code generating device is a silicon serial identification device capable of generating a serial stream of data and electrically coupled to said electronic control device.

10. The remote control transmitter of claim 7 wherein said electronic control device is a microcontroller having a plurality of input connections, a single microcontroller input connection electrically coupled to both said first code generating device and said second code generating device, and a plurality of said microcontroller input connections electrically coupled to said first code generating device.

* * * * *